Figure 1:
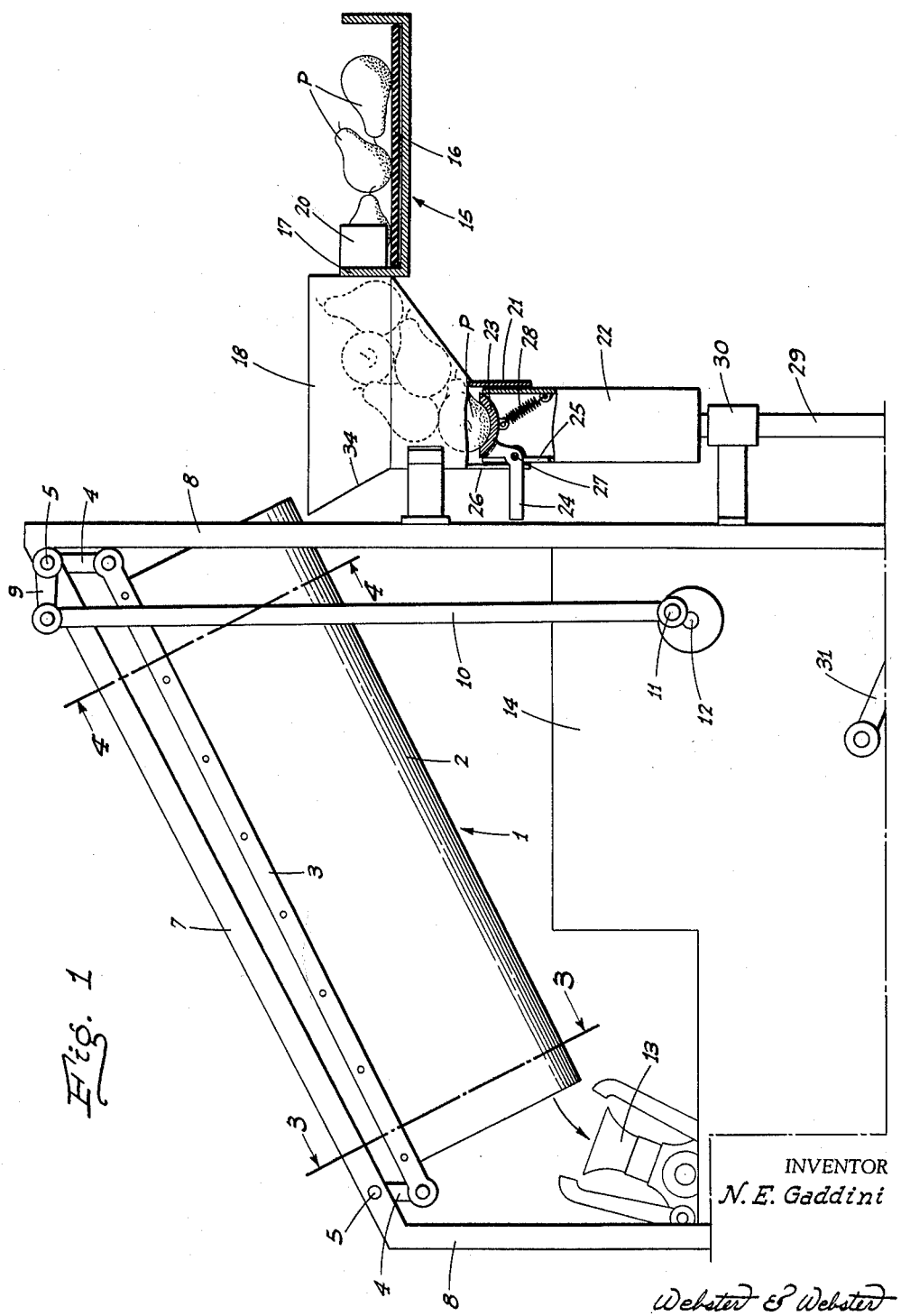

Aug. 27, 1963 N. E. GADDINI 3,101,831
PEAR ORIENTING DEVICE
Filed Feb. 27, 1961 3 Sheets-Sheet 1

INVENTOR
N. E. Gaddini

Webster & Webster
ATTORNEYS

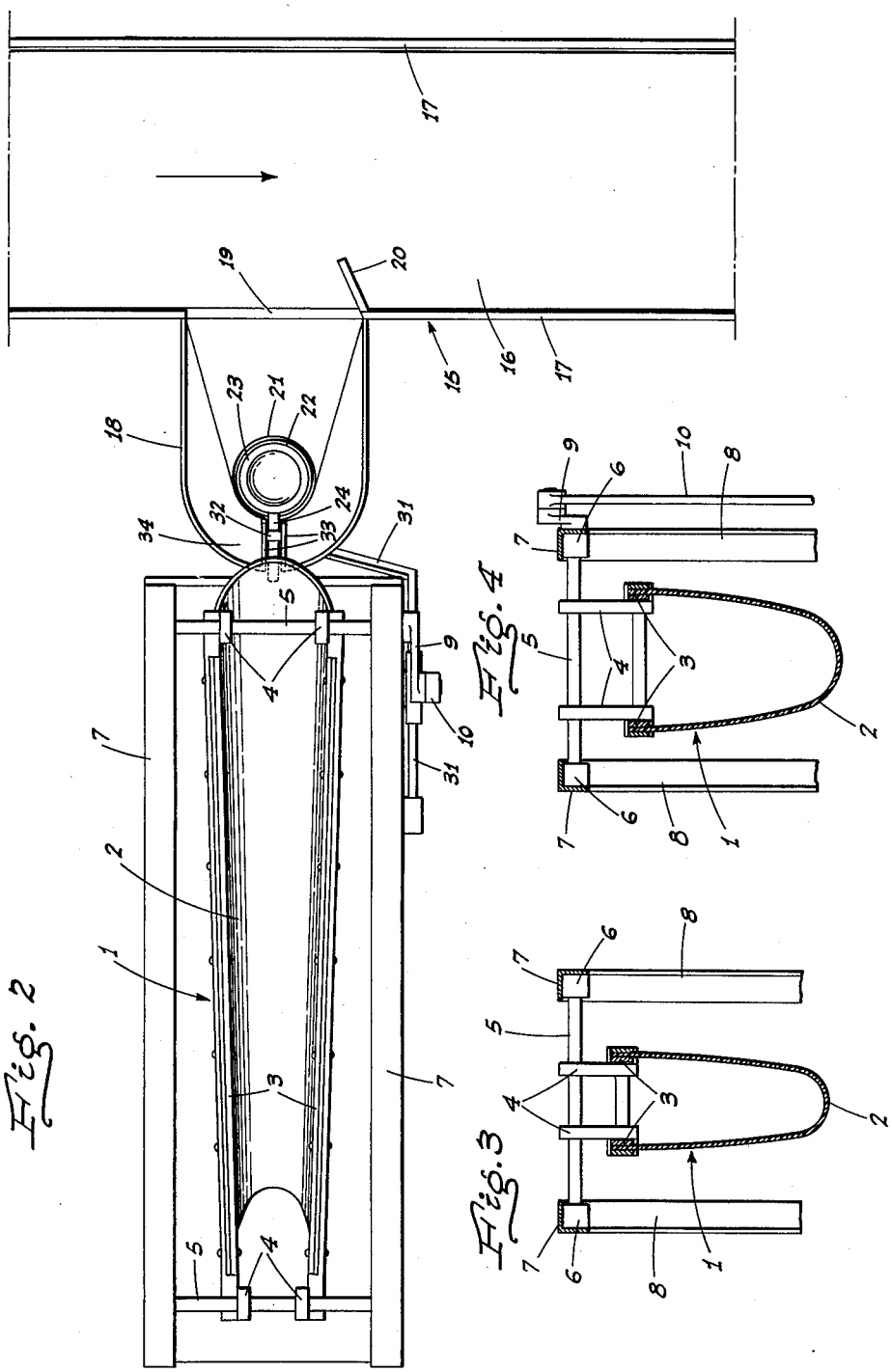

Aug. 27, 1963     N. E. GADDINI     3,101,831
PEAR ORIENTING DEVICE
Filed Feb. 27, 1961     3 Sheets-Sheet 3
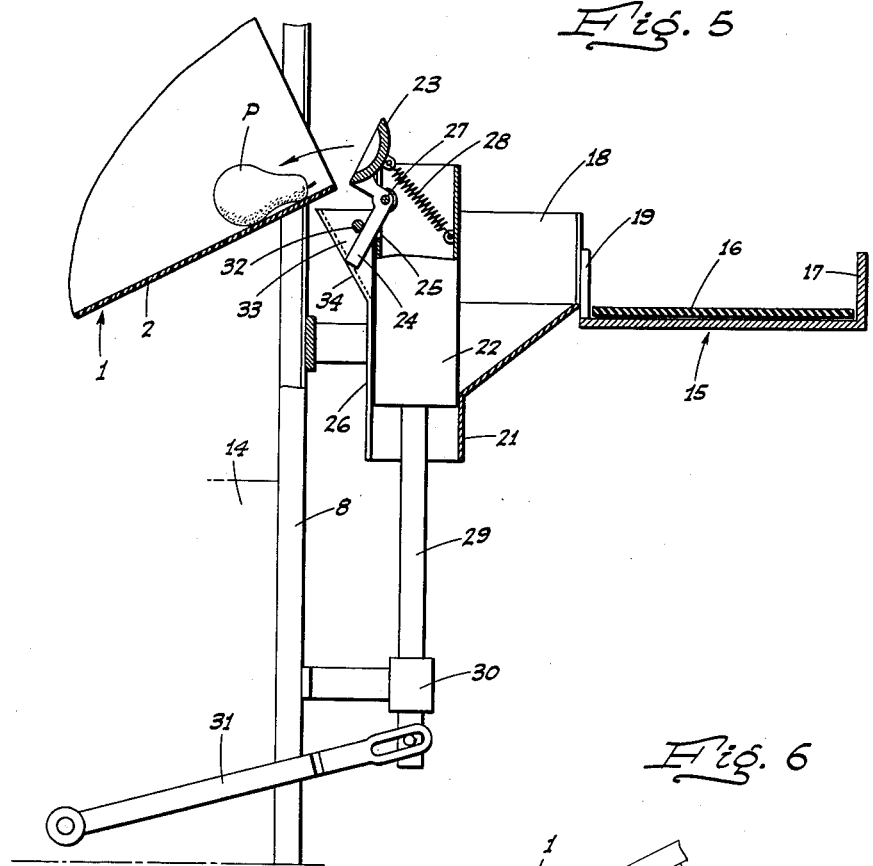
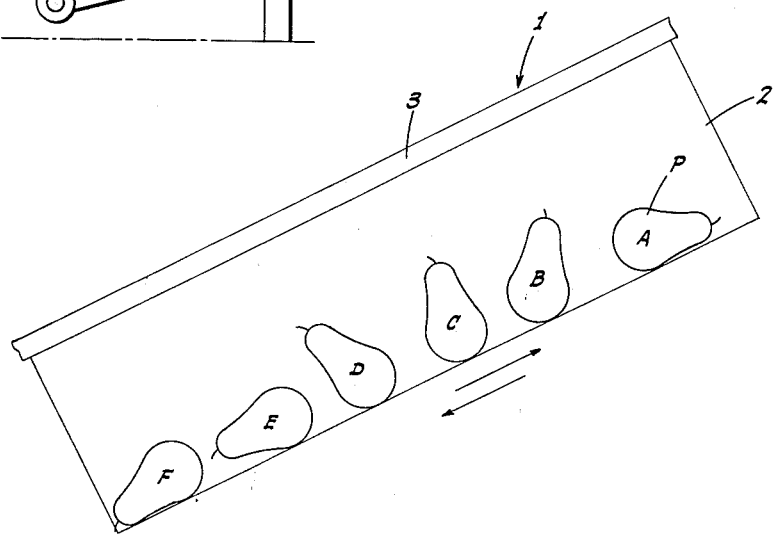

3,101,831
PEAR ORIENTING DEVICE
Norman E. Gaddini, Winters, Calif., assignor to Atlas Pacific Engineering Company, a corporation of California
Filed Feb. 27, 1961, Ser. No. 91,991
6 Claims. (Cl. 198—33)

This invention relates to the fruit canning industry, and particularly to a device adapted for use in connection with a pear peeling and coring machine, to which the pears, due to their shape, must be fed in a certain definite order. Previously, the pears were thus oriented by hand, and with the present costs this is a somewhat expensive operation.

The major object of the present invention is to provide an automatically functioning device which will feed pears to the peeling and coring machine in single-file order and in properly oriented relation.

Another object of the invention is to provide a device for the purpose which will function with equal efficiency in connection with all pears, regardless of variations in their shape, size, and other features.

It is also an object of the invention to provide a practical, reliable, and durable pear orienter, and one which will be exceedingly effective for the purpose for which it is designed.

These objects are accomplished by means of such structure and relative arrangement of parts as will fully appear by a perusal of the following specification and claims.

In the drawings:
FIG. 1 is a side elevation of the pear orienting device, partly in section, and showing the chute feeding elevator in its lowered position.
FIG. 2 is a top plan view of the device.
FIG. 3 is a cross section on line 3—3 of FIG. 1.
FIG. 4 is a similar view on line 4—4 of FIG. 1.
FIG. 5 is a fragmentary sectional elevation of the device, showing the chute feeding elevator in its raised position.
FIG. 6 is a diagrammatic elevation of the orienting chute, illustrating the orienting movement of a pear from the entry end of the chute to the discharge end thereof.

Referring now more particularly to the drawings, and to the characters of reference marked thereon, the essential feature of the device is the orienting chute, indicated generally at 1. This chute is in the form of an elongated sling 2 and is comprised of flexible material, such as a soft type of plastic, so that the sling is naturally rounded along the bottom. The side edges of the sling along the top thereof are secured to rigid bars 3, which at their ends are pivoted to the lower ends of links 4. These links depend from and are rigid with transverse shafts 5 journaled in bearings 6 mounted on longitudinal frame rails 7 which at their ends are supported by uprights 8.

The sling is disposed at a downward slope from one end to the other, and the bars 3 are disposed in converging relation to each other from the high to the low end of the sling, as shown in FIG. 2. As a result, the sling is widest at its upper end, as shown in FIG. 4, and narrowest at its lower end, as shown in FIG. 3; the width of the sling at such lower end at the bottom being approximately equal to the greatest diameter of a pear, while its width at the upper end being of course somewhat wider than such diameter.

One of the shafts 5, laterally out from the sling, is rigid with a generally horizontal arm 9. This arm at its upper end is connected to a depending rod 10, which at its lower end is connected in eccentric relation, as at 11, to a driven shaft 12. In this manner the sling is shaken or reciprocated back and forth.

As a result of the above described positioning and reciprocation of the chute or sling, a pear P deposited in the upper end of the chute in any position almost instantly assumes a longitudinal position with its stem end either down-slope or up-slope, as shown at A. The reciprocation of the chute acts to move the pear gradually down said chute until such pear discharges from the lower end of the chute. If the pear, when at the upper end of the chute, is disposed with its stem down-slope it will retain such position during its movement to the lower end of the chute. If, on the other hand, the pear is initially positioned with its stem crosswise or up-slope, as shown, then the pear will gradually roll over and pass through various positions, as indicated at B, C, D, and E, until it finally assumes the down-slope stem position, as shown at F. This change of position of the pear is of course due to the shape and distribution of the mass thereof, so that the bulk of such mass is toward the end of the pear furthest from the stem.

The lower end of the chute or sling being narrower than the upper end thereof, a pear is thus allowed to freely move about and roll over along the upper portion of the chute until it assumes a proper down-slope stem position. The lower relatively narrow portion of the chute then provides sufficient side-friction on the pear to maintain the same in such proper position.

When the pear discharges from the lower end of the chute it is received in a properly positioned cup 13 by means of which the pear is fed to the peeling and coring machine below, and which is indicated by the outlined area 14.

The pears are fed into the chute-sling at its upper end and in single-file timed relation by the following means:
Disposed a short distance beyond and below the upper end of the chute is a pear supply conveyor 15 which includes a moving belt 16 and side confining walls 17; the conveyor extending transversely of the chute.

A hopper 18, of generally funnel or bucket shape, extends from immediately below the upper end of the chute to the adjacent side wall 17 of the conveyor; said hopper and adjacent wall being cut away to provide an opening 19 to allow pears to feed from the conveyer into the hopper.

A deflector 20 projects laterally inward from said wall 17 at the head end of opening 19 to engage pears moving along the conveyor and divert the same into the hopper. The side of the hopper nearest the chute is substantially semi-circular in plan from a point some distance below the top of the hopper to its lower end and merges into a relatively short full-circle cylinder 21. This cylinder forms a guide for a vertical plunger 22 whose diameter is approximately the same as the body diameter of a pear.

The upper portion at least of the plunger is hollow and open to the top, and normally seated in and closing said top is a shallow cup 23 adapted to seat and support the heavy body portion of a pear P, as shown in FIG. 1. An L-shaped arm 24 depends—and then projects radially out—from the cup in the direction of the chute, passing through a slot 25 in the wall of the plunger, as well as through a slot 26 in the adjacent wall of the hopper and cylinder. Said arm 24, at the junction of the legs thereof, is pivotally mounted on said wall of the plunger on the inside thereof, as shown at 27.

The cup 23 is yieldably maintained in a seated position in the plunger by a tension spring 28 extending between and connected to the under side of the cup and to the plunger some distance below the cup and on the side thereof opposite arm 24. When the cup is thus seated, the outer portion of arm 24 is horizontal, as shown in FIG. 1.

A rod 29 depends from the plunger 22 and through a guide 30 supported from the adjacent frame uprights 8. Below the guide the rod 29 is connected to the outer end of a power-driven vertically reciprocated arm 31. This arm is arranged to have a stroke sufficient to raise the rod, and consequently the plunger, from a lowered position of said plunger such that the cup is at the bottom of the hopper, as shown in FIG. 1, to a raised position such that the upper end of the plunger is slightly above the level of the bottom of sling 2 at the adjacent upper end thereof, as shown in FIG. 5.

Before the plunger—which is the pear elevator—reaches its topmost position the arm 24 comes in contact with a transverse stop 32. This stop is mounted on and extends between flanges 33 which project into the hopper 18 from the sides of the slot 26 along that portion of the hopper which flares, as at 34, away from the plane of the adjacent wall of the cylinder 21. The inner edges of the flanges are straight and alined with the inner face of the adjacent wall of the cylinder 21.

By reason of the form and arrangement of the hopper relative to the elevator plunger, pears piled into the hopper 18 from the conveyor 15 and overlying the cup 23, cannot get behind the plunger and contact the arm 24 so as to possibly interfere with the movement of the cup at the proper time. In operation, therefore, the lowest pear in the hopper moves onto and seats in cup 23 when the latter is in its lowest seated position in the hopper. Upon upward movement of the elevator plunger, any pears above the one seated in the cup are pushed aside and left in the hopper. As the plunger moves to its topmost position and the arm 24 contacts the stop 32, the cup 23 is swung upwardly and toward the chute, so that by the time the plunger reaches its topmost position the cup will have discharged the pear into the upper end of the sling, as indicated in FIG. 5.

Since the plunger 22 is at least as large in diameter as the cup 23, no pears in the hopper can get under the cup as the plunger then descends, and which would cause the pears to be crushed, or at least bruised.

The speed of reciprocation of the elevator plunger is timed to the operation of the peeling and coring machine, so that pears will be fed to the chute, and thence to the machine, in single-file order and in the necessary timed sequence.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A pear orienting device comprising a chute which includes an elongated sling of flexible material and of rounded bottom form in section, and rigid bars extending along and secured to the upper edges of the sling; rigid supporting rails above the bars, pivoted links extending between the rails and bars supporting the chute for longitudinal shaking movement and at a downward slope from one end to the other, and means to impart such shaking movement to the chute; the pears to be oriented being deposited in single-file order into the sling at its upper end, and the bars being disposed in converging relation to each other from the upper to the lower end of the sling whereby the latter is of correspondingly decreased width from its upper to its lower end.

2. A method of orienting pears by the use of an elongated inclined sling of flexible material and open at its lower end, comprising the steps of depositing pears in single file order and in any position in the sling at its upper end, imparting a longitudinal shaking action to the sling to cause the pears to advance along the sling, and gradually confining the pears laterally as they so advance whereby such pears are each caused to assume a position in the sling at its lower end with the stem of the pear facing such end.

3. A pear orienting device comprising an elongated open-ended chute unobstructed from end to end, means mounting the chute at a downward slope from one end to the other and for longitudinal shaking movement, means to so shake the chute, said chute being in the form of a sling of flexible material and of rounded-bottom shape in section and of gradually decreasing width from its upper to its lower end; said chute being arranged to receive pears to be oriented one at a time at its upper end and its width at the lower end being substantially equal to the biggest width of a pear.

4. A pear orienting device comprising an elongated gradually narrowing chute adapted at its upper end to receive the pears one at a time for individual movement down the chute; the latter including yieldable spaced-apart and substantially vertical side portions disposed relative to each other so as to engage, and of a nature to impose a frictional drag on, the individually moving pears at substantially the maximum diameter thereof, and longitudinal rigid elements supporting and extending along the upper edges of said side portions.

5. A method of orienting pears each having a bulb end and a stem end by the use of an elongated inclined sling of flexible material open at its lower end comprising: depositing pears in a single file order and in any position in the sling at its upper end, imparting a longitudinal shaking action to the sling to cause the pears to advance along the sling and exerting a confining action on the bulb end of each pear by positioning the lateral walls of the sling sufficiently close to one another that a frictional drag is exerted on the bulb end of the pear as each advances whereby each such pear is each caused to assume a position in the sling at its lower end with the stem end of each pear facing such end.

6. A device for orienting a pear having a bulb end and a neck, the device comprising an elongated open-ended chute unobstructed from end to end, means mounting the chute at a downward slope from one end to the other and for longitudinal shaking movement, means to so shake the chute, said chute being in the form of a sling of flexible material and of rounded-bottom shape in section, said mounting means providing independent support for each longitudinal edge of said chute farthest removed from the bottom thereof whereby to provide independent support for each longitudinal edge along lines spaced transversely a distance such that a pear placed therein will experience a frictional drag on the bulb end of a pear by contact with the walls of said sling, said chute being arranged to receive each pear to be oriented one at a time at its upper end and its width being substantially equal to the greatest diameter of the bulb end of each pear to be oriented.

(References on following page)

References Cited in the file of this patent

UNITED STATES PATENTS

| | | | |
|---|---|---|---|
| 920,296 | Erwin et al. | May 4, | 1909 |
| 1,013,506 | Miller et al. | Jan. 2, | 1912 |
| 1,167,907 | Lein | Jan. 11, | 1916 |
| 1,266,668 | Drew | May 21, | 1918 |
| 1,649,304 | Gray | Nov. 15, | 1927 |
| 1,715,111 | Younie | May 28, | 1929 |
| 2,155,612 | Morris | Apr. 25, | 1939 |
| 2,516,005 | Kosla | July 18, | 1950 |
| 2,581,634 | Coons | Jan. 8, | 1952 |
| 2,772,769 | Behnke | Dec. 4, | 1956 |
| 2,832,460 | Lauer | Apr. 29, | 1958 |
| 2,911,082 | Wenzel et al. | Nov. 3, | 1959 |

FOREIGN PATENTS

| | | | |
|---|---|---|---|
| 12,349 | Austria | June 25, | 1903 |
| 814,344 | Germany | Sept. 20, | 1951 |
| 459,132 | Italy | Aug. 25, | 1950 |